US012312862B2

(12) United States Patent
Heissenberg

(10) Patent No.: US 12,312,862 B2
(45) Date of Patent: May 27, 2025

(54) SPRING LOADED SCREEN FABRIC RETENTION DEVICE

(71) Applicant: Michael Heissenberg, Port St. Lucie, FL (US)

(72) Inventor: Michael Heissenberg, Port St. Lucie, FL (US)

( * ) Notice: Subject to any disclaimer, the term of this patent is extended or adjusted under 35 U.S.C. 154(b) by 242 days.

(21) Appl. No.: 18/166,105

(22) Filed: Feb. 8, 2023

(65) Prior Publication Data

US 2024/0263514 A1 Aug. 8, 2024

(51) Int. Cl.
*E06B 9/58* (2006.01)
*E06B 9/42* (2006.01)
*E06B 9/00* (2006.01)

(52) U.S. Cl.
CPC ................ *E06B 9/581* (2013.01); *E06B 9/42* (2013.01); *E06B 2009/005* (2013.01)

(58) Field of Classification Search
CPC ...... E06B 9/581; E06B 9/42; E06B 2009/005; E06B 9/58; E06B 9/54; E06B 2009/588
See application file for complete search history.

(56) References Cited

U.S. PATENT DOCUMENTS

| | | | | |
|---|---|---|---|---|
| 8,607,841 | B2 * | 12/2013 | Hayashiguchi | E06B 9/581 160/273.1 |
| 9,719,292 | B1 * | 8/2017 | James | E06B 9/00 |
| 10,036,198 | B2 * | 7/2018 | James | E06B 9/58 |
| 11,326,395 | B2 | 5/2022 | Heissenberg | |
| 11,982,125 | B2 * | 5/2024 | James | E06B 9/58 |
| 12,018,527 | B2 * | 6/2024 | Murray | E06B 9/42 |
| 2006/0137836 | A1 | 6/2006 | Harbison | |

FOREIGN PATENT DOCUMENTS

| | | |
|---|---|---|
| CN | 112627705 | 4/2021 |
| CN | 115379781 | 11/2022 |

* cited by examiner

*Primary Examiner* — Beth A Stephan
(74) *Attorney, Agent, or Firm* — McHale & Slavin, P.A.

(57) ABSTRACT

A spring loaded screen fabric retention device in the form of a motor and spring combination for a hurricane screen fabric. The combination overcomes the change in torque for use with a motor driven hurricane screen fabric system, allowing the motor to operate if there is a change in the initial torque which otherwise will interrupt motor operation. The device allows vertical deployment of screen fabric when the motor is idle, which prevents the base slat from lifting during high wind loads. A spring torque between 100% to 150% of the curtain weight is maintained on the tubular motor used for lifting and deploying of the hurricane screen fabric.

8 Claims, 4 Drawing Sheets

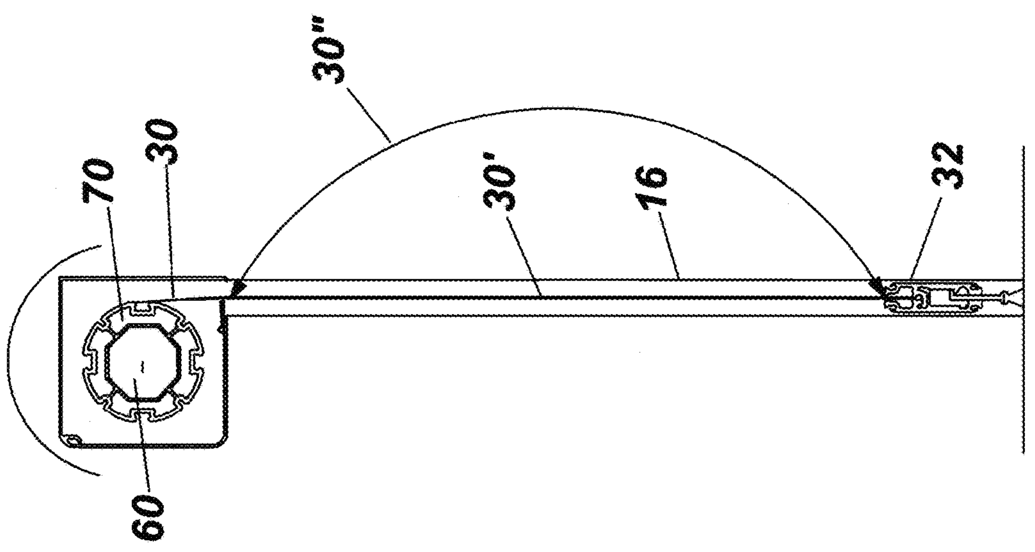
Fig. 8
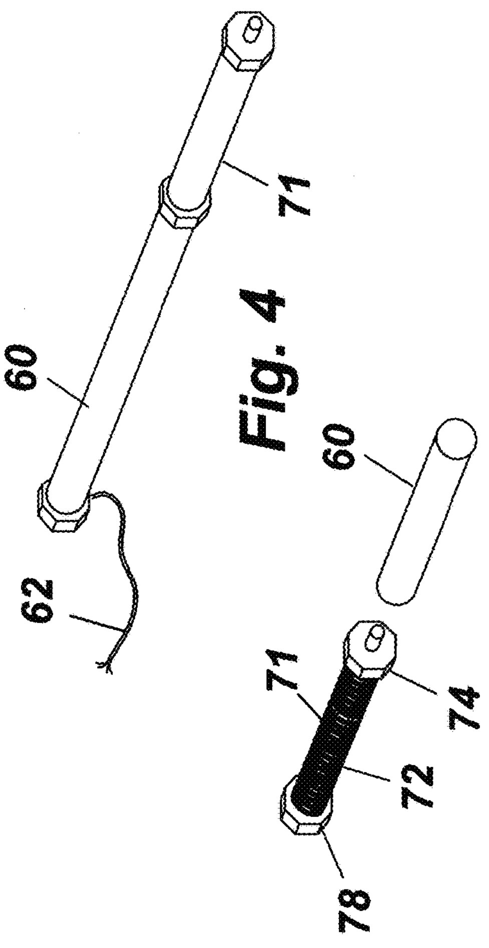
Fig. 4
Fig. 3
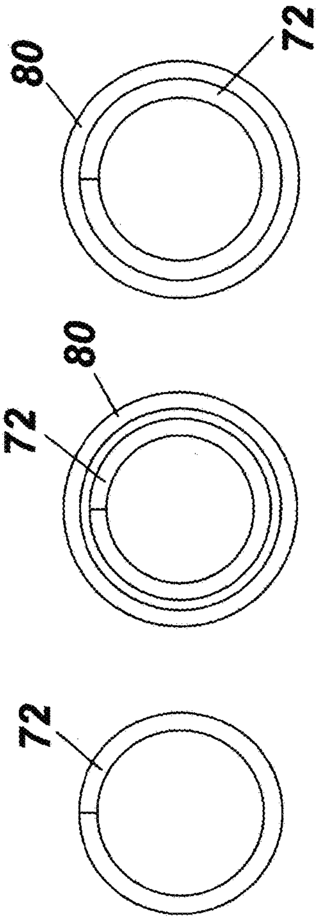
Fig. 7
Fig. 6
Fig. 5

SPRING LOADED SCREEN FABRIC RETENTION DEVICE

FIELD OF THE INVENTION

The present invention relates to the field of hurricane screen fabrics and, more particularly, to a spring loaded retention device for securing screen fabrics used in high wind environments.

BACKGROUND OF THE INVENTION

Property protection is of paramount importance to property owners. Damage from high winds is preventable by covering openings, patios, and the like structures that are susceptible to high winds. For instance, hurricane force winds can quickly breach an opening of a structure, resulting in extensive damage. Windows and doors, if pierced open by flying debris, place the entire structure at risk. Once winds are allowed inside a property, debris and wind changes the air pressure quickly and intensely. In an instance, the change in air pressure with wind accompaniment can lift the roof off the property. Covered patios are but another example of property areas that can be damaged if wind is able to get below the roof.

Roll up hurricane shutters are well known in their ability to prevent wind breaching. Roll up shutters provide excellent frangible area coverage and, once installed, can be deployed by simply drawing interconnected panels from a storage housing. The interconnected panels are difficult to breech, providing excellent security coverage that can be deployed by simply pulling the shutters from a shutter housing. In many instances, the use of screen fabrics have become a desirable alternative, as the screen fabric is less weight and easier to store. In many instances, the screen fabrics can be stored on site using a retractable system wherein screen fabric edges are fed through channels to provide securement without additional fasteners. For high winds, a screen fabric having a continuous edge attachment is more secure than a screen fabric having spaced apart fasteners. While screen fabrics allow some wind to pass, if rain is present, the water acts as a wind barrier wherein no wind can pass through the screen fabric. When this occurs, the screen fabric acts as a sail and subjects the fasteners to the highest possible pressures.

In certain instances, hurricane screen fabrics have become the choice of protection. For instance, when the area to be protected is large, use of a screen fabric may be the only practical option. A screen fabric can be rolled into a storage housing that is smaller in size than a shutter storage housing having a similar length. Hurricane screen fabrics are the preferred articles for sunlight shading and insect blocking. A typical hurricane screen fabric installation consists of a storage housing containing a roll of hurricane screen fabric. In a preferred embodiment, the roll can be rotated for deployment of the screen fabric or retraction of the screen fabric. A base slat is attached to the distal end of the screen fabric which is drawn to the floor, window or door sill and secured thereto using a track. A common problem with all known hurricane screen fabrics is that the base slat lifts off the floor in windy conditions. Reports indicate that the base slats may lift off the floor by several inches or completely pull out of the track in winds of only 30-40 mph.

Hurricane screen fabric is formed from a fabric typically woven using two materials, a polymer in the horizontal direction and aramid (Kevlar) in the vertical direction. This causes the fabric to stretch and billow in the polymer (Horizontal) direction and not stretch or billow in the aramid (Vertical) direction. In this configuration, when wind pressure is applied, the fabric is held firmly by the housing along the top and the tracks on either side. The screen fabric is essentially a wind block at higher wind speeds, placing the most pressure on the base slat. As a result, the fabric begins to lift the base slat off the floor. For instance, a 24 foot screen fabric unit will lift the base slat approximately two feet off the floor.

Various prior art references address ways of securing a screen fabric. U.S. Patent Publication 2006/0137836 discloses a sealing curtain assembly having a pair of tracks attached to opposite sides of an opening. Each track includes a spring system which urges the tracks outwardly to maintain the curtain taut. The spring system employs a connecting member, preferably a bolt, which allows the track edges to separate from a frame member. In one embodiment, a compression spring and washer are located between the head of each connecting member and track. A problem with the use of spring-loaded connecting members is that the spacing between each member provides an area for the screen fabric to bind between connecting members.

U.S. Pat. No. 8,607,841 discloses a screen fabric device having inner rails that are embedded inside fixed guide rails which guide protrusions at side edges of a screen fabric which is wound via a take-up shaft. Each inner rail has a guide groove in which the guide protrusion is inserted, and inward flanges are provided at an opening of the guide groove. Rail members have outer side protrusions and inner side protrusions of different heights at both side edges of a rail base plate. The higher outer side protrusions are confronting. A micro gap extends between the lower inner side protrusions into the guide groove such that the micro gap is opposed to a guide gap formed between the opposed inward flanges. The guide protrusion is slid and guided in a come-off preventing state by the inner side protrusion, so that an extremely thin fastener element can be used as the guide protrusion. While spacing of the screen fabric edge allows for movement, the use of an inner guide rail that is spaced apart allows for screen fabric wrinkles.

Applicant's U.S. Pat. No. 11,326,395, entitled Retractable Screen with Horizontal Tensioning Track and Vertical Biasing Member, discloses a retractable screen fabric device for a framed opening employing a frame track fastened to each side support of the framed opening, forming a compartment. A guide rail is positioned within each compartment of each frame track extending the longitudinal length of each frame track. A decompression gasket is positioned between the frame track and the guide rail.

What is needed in the art is a spring loaded screen fabric retention device to avoid lifting of the base slat.

SUMMARY OF THE INVENTION

Disclosed is a spring loaded screen fabric retention device in the form of a motor and spring combination for a hurricane screen fabric. The combination overcomes the change in torque so as to allow the motor to operate if there is a change in the initial torque interrupting motor operation. The problem to overcome is when the motor detects a change in the initial torque and will not operate.

An objective of the invention is to prevent the base slat from lifting to high wind loads.

Another objective of the invention is to disclose the use of an electric motor with a spring to retain a specific amount of torque at all times, equal to or greater than the total weight of a screen fabric; the spring having the capacity to add torque when it is needed.

Yet another objective of the invention is to disclose a spring loaded retention device for securing screen fabrics wherein a drive motor will not detect a change in torque, allowing the motor to operate normally. When high winds are encountered, the spring loaded retention device will add torque and allow additional fabric to deploy without causing the base slat to lift. After the winds subside, the spring will return to its retained state.

Yet still another objective of the invention is to teach the use of a torsion member to place a consistent tension on a motor and allow a flexible screen fabric an amount of space to expand.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

FIG. 3 is a perspective view of a spring with a tube retainer;

FIG. 4 is a perspective view of a motor with the tube retainer placed over the spring;

FIG. 5 is an end view of the spring at idle without tension;

FIG. 6 is an end view of the spring with a tube around the coil;

FIG. 7 is an end view of the spring with the tube in a retaining position;

FIG. 8 is a side view of the motor and spring, depicting the screen fabric in a high wind position;

DETAILED DESCRIPTION OF THE PREFERRED EMBODIMENT

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
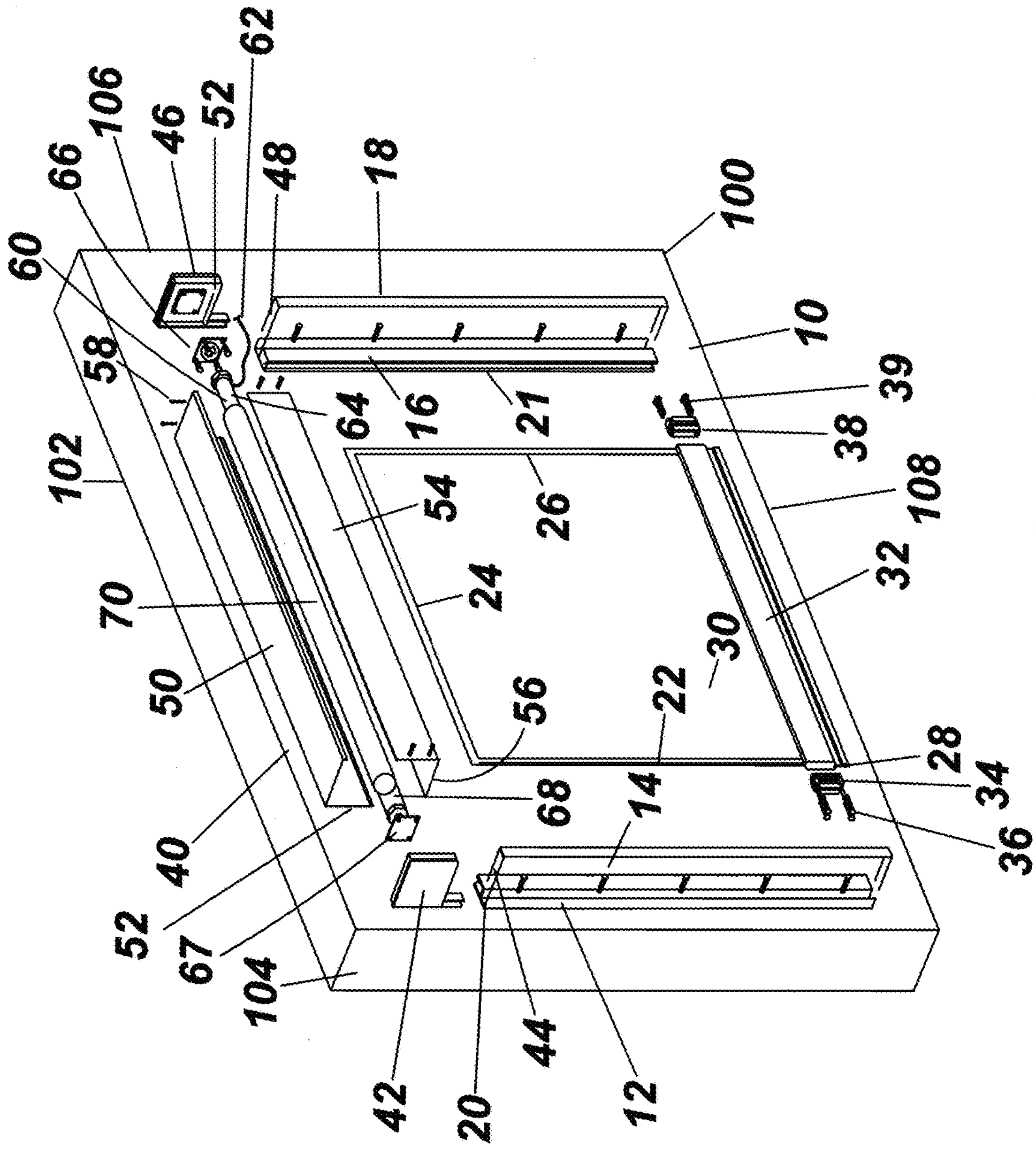
FIG. 1 is a perspective view of a spring loaded retention device on a rolling screen fabric.

Referring to FIG. 1, illustrated is a spring loaded screen fabric retention device 10 for a framed opening 100. The framed opening is defined by a header 102, opposing side supports 104, 106, and a bottom 108. The spring loaded screen fabric retention device 10 is formed from a first side rail 12 with a first side rail cover 14 fastened to the first side support 104. A second side rail 16 with a second side rail cover 18 is fastened to the second side support 106. The first side rail 12 includes an elongated receptacle 20 constructed and arranged to receive a first side edge 22 of a flexible screen fabric 30; the second side rail 16 having an elongated receptacle 21 forming a mirror image of the first side rail 12 receptacle 20, constructed and arranged to receive a second side edge 26 of the flexible screen fabric 30.

The preferred flexible screen fabric 30 is screen fabric material constructed of polymer threads running between the first side edge 22 and the second side edge 26 in a horizontal plane. The first and second side edges 22, 26 would include a slide mechanism which resembles a zipper element, which is constructed and arranged to slide along the elongated receptacles 20, 21; the zipper element providing a thickness to resist pulling away from the elongated receptacles 20, 21. A plurality of breaks in the zipper element allow the screen fabric material to be tightly wound for storage purposes. The preferred flexible screen fabric 30 is made of aramid (Kevlar) threads placed in a vertical position and interwoven with the polymer threads extending from the upper edge 24 to the bottom edge 28. The bottom edge 28 is attached to an aluminum base slat 32. An end retention element 34 is secured to the base slat with fasteners 36 along the first side edge 22, and end retention element 38 is secured to the base slat 32 along the second side edge 26 with fasteners 39.

A housing 40 is secured to the header 102. The housing 40 is formed of a first end cap 42 secured to a top 44 of the first rail 12 and a second end cap 46 secured to a top 48 of the second rail 16. The housing 40 is formed by an upper panel 50 having a back side wall 52 and a lower panel 54 having a bottom side wall 56. The panels 50, 54 are secured together using fasteners 58 to form a rectangular storage box for securement of a tubular motor 60 which is electrically coupled 62 to a power source. The tubular motor 60 has a proximal end 64 coupled to a second bearing bracket 66 which is fastened to the second end cap 46; the second end cap 46 having an edge 52 for securing the second end of the housing 40 to the top 48 of the second rail 16. Similarly, the distal end 68 of the tubular motor 60 is coupled to a first bearing bracket 67 fastened to the first end cap 42, securing the tubular motor 60 to the housing 40 and first rail 12. The upper edge 24 of the screen fabric is attached to an axle 70. The motor 60 connects to the idler end of a small, but stout, spring 72. The torque transfers through the spring assembly 72 and drives a tube 80. During normal motor operations, the spring 72 remains stationary and the motor 60 moves the screen fabric up and down. When the unit is in the down position and pressures are applied, the motor 60 remains stationary and the spring 72 rotates and deploys additional screen fabric. As a result, the base slat 32 remains on the floor and does not lift up.

Figure 2:
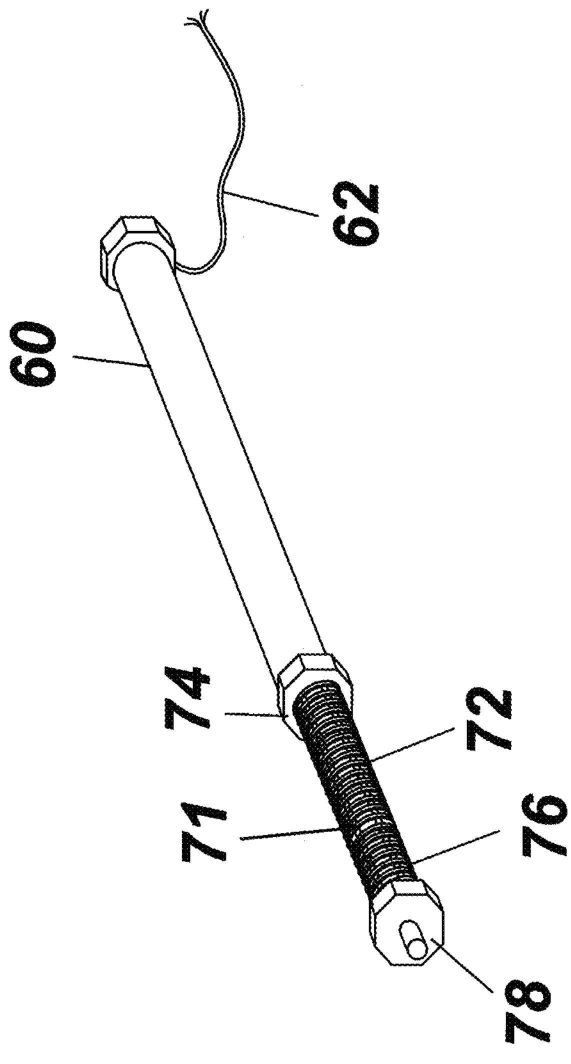
FIG. 2 is a perspective view of a motor with a spring.

Referring to FIGS. 2-4, the tubular motor 60 employs an extension shaft 71. A coil spring 72 is positioned over the extension shaft 71 with an idler end 74 secured to the tubular motor 60 and a second end 76 attached to a drive element 78. A tube 80 is placed over the spring 72 in a coiled position for retaining spring tension. When torsion is added to the spring 72, the behavior of the spring 72 is to wrap coils tighter and tighter, wherein the coil diameter is gradually reduced. To accommodate this, torsion is added to the spring 72 (rotation), and while the coils are compressed, the tube 80 is placed around the coils. When torsion from the spring 72 (rotation) is reduced, the coils expand until they fill the inside diameter of the tube 80, therefore retaining a portion of the spring's torque. This allows the spring 72 to retain a specified amount of torque at all times, while still allowing the spring 72 to add torsion (rotation) when needed and return back to a retained state. The continuous torsion allows the motor 60 to operate normally, since the retained torsion is equal to or greater than the weight of the screen fabric 30, The end result is that the motor 60 operates normally and additional torsion is available when needed. As a result, the base slat 32 remains on the floor during times of high winds and will not lift up.

FIG. 5 is an end view of the spring 72 at idle without tension. FIG. 6 is an end view of the spring 72 with a tube 80 around the coil. The spring with tension is applied, wherein the coil diameter is reduced and the tube 80 can be placed around the spring 72. FIG. 7 is an end view of the spring 72 with the tube 80 in a retaining position. The spring 72 with relieved tension causes the coil diameter to increase and the tube 80 is retaining the spring tension.

FIG. 8 is a side view of the axle 70 with the screen fabric 30 deployed. The bottom 28 of the screen fabric 30 is attached to the base slat 32. During deployment, the screen fabric 30' extends along the side rail 16 in a vertical format. Under high wind conditions the motor 60 remains fixed and the spring rotates to deploy additional screen fabric 30".

Figure 9:
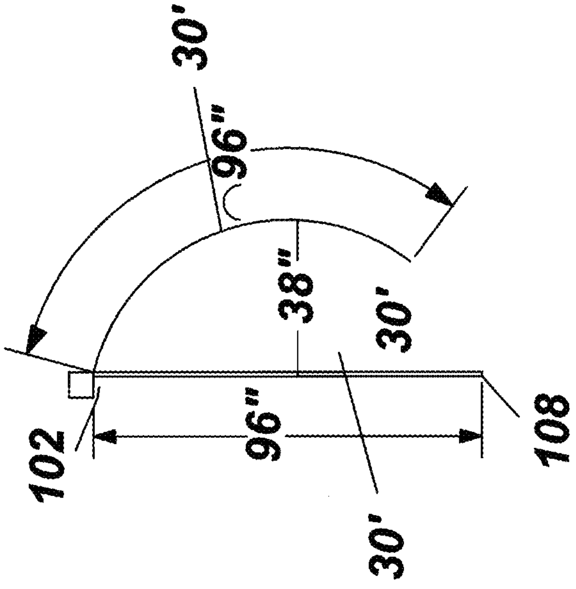
FIG. 9 is a diagram of the fabric in an idle position and under pressure.

FIG. 9 depicts an example of a conventional opening wherein the distance between the bottom 108 and header 102 of the frame 100 is about 96 inches. In an idle position, the screen fabric 30 is deployed in the vertical stance. When a high wind load pressure is applied, and there is no mechanism to allow screen fabric deflection, the screen fabric 30' deflects 38 inches causing the base slat to lift up 24 inches.

Figure 10:
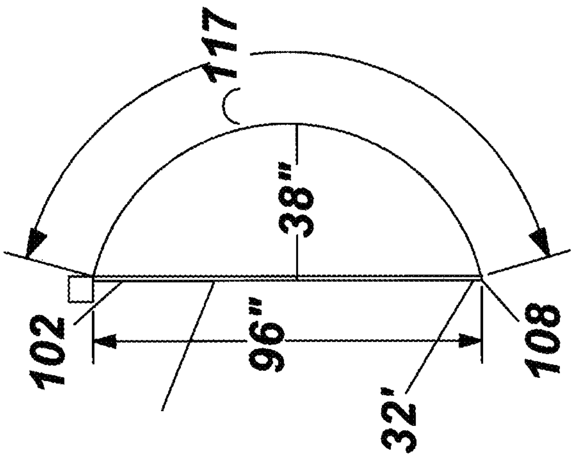
FIG. 10 is a diagram of the additional fabric provided by the device.

FIG. 10 depicts an example of an application wherein the distance between the bottom 108 and header 102 of the frame 100 is about 96 inches. In an idle position, the screen fabric 30 is deployed in the vertical stance. When a high wind load pressure is applied, and the spring loaded motor of the instant invention is employed, the screen fabric 30' deflects 38 inches by drawing additional screen fabric from the axle, allowing the screen fabric to deflect but removing the pressure on the base slat 32 to keep the screen fabric secured to the floor. The tubular motor 60 allows the screen fabric 30 to wrap around the axle in a stowage position and extend the base slat 32 to the bottom in a deployed position, whereby the spring 72 allows the axle to deploy additional screen fabric under high wind condition, allowing the base slat 32 to maintain contact with the bottom 108 of the framed opening 100.

Figure 11:
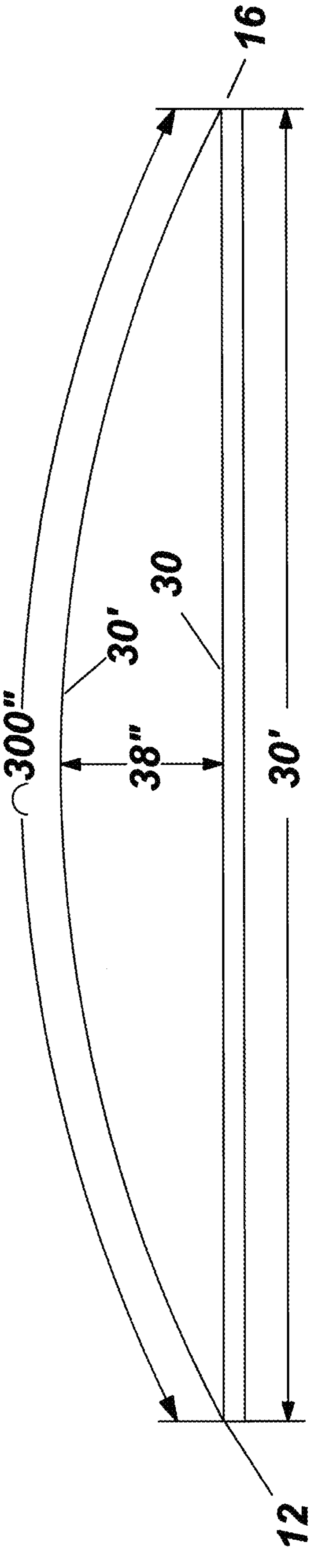
FIG. 11 is a diagram of the roller screen fabric deflection.

Referring to FIG. 11, the top end view depicts the screen fabric 30 in an idle position on a frame opening having a width of about 288 inches. Using a preferred screen material having polymer threads in a horizontal position, the fabric 30' can expand about 38 inches during the high wind loading. This expansion relieves the pressure on the side rails 12, 16. This is made possible as the polymer can stretch about 12 inches in the horizontal plane; no stretching occurs using Kevlar in the vertical plane.

Calculation of the total curtain weight is necessary to size the total spring torque. In the preferred embodiment, the total spring torque is 150% of the curtain weight. Total curtain weight is calculated by adding the fabric weight, base slat weight, and additional friction weight. Once the total curtain weight is calculated the total spring torque can be estimated. Fabric weight is calculated by multiplying the width (ft) of the screen against the height (ft) of the screen. The total fabric in pounds (lbs) is calculated by multiplying the total area in square feet against the fabric in pounds per square foot to obtain the total fabric weight (lbs). The base slat weight is obtained by multiplying the unit width (ft) against the base slat weight (lbs). Additional friction weight is calculated by multiplying the unit height (ft) by the additional fiction per linear foot to obtain the total friction in pounds.

Total spring torque is calculated by taking the total curtain weight in pounds which would equal 100% of the confined spring torque. An additional spring torque of 50% is added to the total curtain weight. The preferred total spring torque range is between 100% to 150% of the curtain weight.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A spring loaded screen fabric retention device for a framed opening having a header, opposing side supports, and a bottom, said spring loaded screen fabric retention device comprising:

a first side rail fastened to a first side support, a second side rail fastened to a second side support, each said side rail forming an elongated receptacle;

a housing having a first end secured to a top of said first rail and a second end secured to a top of said second rail;

a tubular motor electrically coupled to a power source with a proximal end secured to said housing, and a distal end coupled to an extension shaft;

a coil spring positioned over said extension shaft with an idler end secured to said tubular motor and a second end attached to a drive element;

an axle constructed and arranged to cooperate with said tubular motor and said coil spring, said axle maintaining a torque on said coil spring; and a flexible screen fabric having a top end edge attached to said axle, side edges attached to said first and second side rail, and a bottom edge secured to a base slat;

wherein said tubular motor allows said screen fabric to wrap around said axle in a stowage position and extend said base slat to the bottom in a deploy position, whereby said spring allows said axle to deploy addition screen fabric under high wind condition, allowing said base slat to maintain contact with the bottom of the framed opening.

2. The spring loaded screen fabric retention device according to claim 1 wherein said axle is secured to said housing with a bearing bracket.

3. The spring loaded screen fabric retention device according to claim 1 wherein said screen fabric is hurricane rated.

4. The spring loaded screen fabric retention device according to claim 1 wherein said screen fabric consists of a polymer in the horizontal direction and aramid (Kevlar) in the vertical direction.

5. The spring loaded screen fabric retention device according to claim 1 wherein torsion is added to said spring to cause tighter coils before placement within said axle, said coils expand until they fill the inside diameter of said axle to retain a torsion that is equal to or greater than the weight of the screen fabric.

6. The spring loaded screen fabric retention device according to claim 5 wherein said spring torque is between 100% to 150% of the curtain weight.

7. The spring loaded screen fabric retention device according to claim 6 wherein an additional spring torque of 50% is added to the total curtain weight.

8. The spring loaded screen fabric retention device according to claim 1 wherein said spring remains stationary during normal motor operations and said spring rotates to deploy additional fabric under high wind load conditions.

* * * * *